United States Patent [19]

Grieger et al.

[11] Patent Number: 5,827,985
[45] Date of Patent: Oct. 27, 1998

[54] SENSOR APPARATUS FOR PROCESS MEASUREMENT

[75] Inventors: Bernd D. Grieger; Donald D. Cummings, both of Greenwood, Ind.

[73] Assignee: Endress + Hauser GmbH + Co., Maulburg, Germany

[21] Appl. No.: 735,736

[22] Filed: Oct. 23, 1996

Related U.S. Application Data

[63] Continuation-in-part of Ser. No. 574,818, Dec. 19, 1995, Pat. No. 5,661,251.

[51] Int. Cl.$^6$ .............................. G01D 5/12; G01F 23/24
[52] U.S. Cl. ........................................ 73/866.5; 73/304 R
[58] Field of Search ............................... 73/806.5, 304 R, 73/304 C

[56] References Cited

U.S. PATENT DOCUMENTS

| | | | |
|---|---|---|---|
| 2,955,466 | 10/1960 | Coles | 73/304 C |
| 3,339,411 | 9/1967 | Riffie | 73/304 R |
| 3,367,183 | 2/1968 | Webster | 73/304 C |
| 3,832,900 | 9/1974 | Ross | 73/290 R |
| 3,922,914 | 12/1975 | Fuchs | 73/290 R |
| 3,995,212 | 11/1976 | Ross | 73/304 R |
| 4,010,537 | 3/1977 | Oxenreider | 73/304 R |
| 4,135,397 | 1/1979 | Krake | 73/240 R |
| 4,301,681 | 11/1981 | Maltby et al. | 73/304 C |
| 4,322,832 | 3/1982 | Sartorius | 368/47 |
| 4,408,822 | 10/1983 | Nikitas | 439/583 |
| 4,449,405 | 5/1984 | Franz et al. | 73/304 C |
| 4,465,088 | 8/1984 | Vosper | 73/304 R |
| 4,507,521 | 3/1985 | Goellner | 73/304 R |
| 4,944,861 | 7/1990 | Reber | 204/428 |
| 5,035,237 | 7/1991 | Dalrymple et al. | 364/562 |
| 5,122,740 | 6/1992 | Cottom et al. | 73/661 X |
| 5,272,921 | 12/1993 | Föller et al. | 73/304 R |
| 5,323,361 | 6/1994 | Elle et al. | 367/98 |
| 5,339,861 | 8/1994 | Smith, III | 137/614.04 |
| 5,345,471 | 9/1994 | McEwan | 375/1 |
| 5,361,070 | 11/1994 | McEwan | 324/21 |
| 5,376,888 | 12/1994 | Hook | 324/643 |
| 5,391,839 | 2/1995 | Lars et al. | 73/304 C |
| 5,420,517 | 5/1995 | Skaling et al. | 324/643 |

FOREIGN PATENT DOCUMENTS

| | | | |
|---|---|---|---|
| 0 260 113 | 3/1988 | European Pat. Off. . | |
| 0 534 654 | 3/1993 | European Pat. Off. . | |
| 1230548 | 9/1960 | France | 73/304 C |
| 1648163 | 4/1970 | Germany | 73/304 C |
| 2744864 | 4/1979 | Germany | 73/304 C |
| 33 37 690 | 4/1985 | Germany . | |
| 4118715 | 12/1992 | Germany | 73/304 C |
| 42 04 414 | 6/1993 | Germany . | |
| 43 08 373 | 9/1994 | Germany . | |
| 2064128 | 6/1981 | United Kingdom | 73/304 C |
| 1 599 695 | 10/1981 | United Kingdom . | |
| 2079950 | 1/1982 | United Kingdom | 73/304 C |
| WO 93/24812 | 12/1993 | WIPO . | |

*Primary Examiner*—Thomas P. Noland
*Attorney, Agent, or Firm*—Bose McKinney & Evans

[57] ABSTRACT

A sensor apparatus is provided for transmitting electrical pulses from a signal line into and out of a vessel to measure a process variable. The sensor apparatus has a mounting section, at least one dielectric insert, a conductive transitioning pin, a metallic insert, a probe element, and an electrical connector to the signal line. The mounting section is configured to be coupled to the vessel and includes a central aperture with a first tapered surface. The dielectric insert has a second and third tapered surface. The second tapered surface is configured to engage the first tapered surface of the mounting section to prevent movement of the dielectric insert in a direction away from the mounting section. The conductive transitioning pin has a fourth tapered surface configured to engage the third tapered surface of the dielectric insert. The metallic insert is located above the transitioning pin and the dielectric insert, and is coupled to the mounting section to secure the dielectric insert within the mounting section. The conductive probe element is coupled to the transitioning pin and extends downwardly through the dielectric insert and into the vessel. The electrical connector is coupled to the transitioning pin and is configured to couple the signal line to the probe element through the transitioning pin.

11 Claims, 11 Drawing Sheets

SENSOR APPARATUS FOR PROCESS MEASUREMENT

This application is a continuation-in-part application of U.S. application Ser. No. 08/574,818, filed Dec. 19, 1995, and now U.S. Pat. No. 5,661,251.

BACKGROUND AND SUMMARY OF THE INVENTION

The present invention relates to a sensor apparatus for transmitting electrical pulses from a signal line into and out of a vessel to measure a process variable.

The process and storage industries have long used various types of equipment to measure process parameters such as level, flow, temperature, etc. A number of different techniques (such as mechanical, capacitance, ultrasonic, hydrostatic, etc.) provide measurement solutions for many applications. However, many other applications remain for which no available technology can provide a solution, or which cannot provide such a solution at a reasonable cost. For many applications that could benefit from a level measurement system, currently available level measurement systems are too expensive.

In certain applications, such as high volume petroleum storage, the value of the measured materials is high enough to justify high cost level measurement systems which are required for the extreme accuracy needed. Such expensive measurement systems can include a servo tank gauging system or a frequency modulated continuous wave radar system.

There are many applications that exist where the need to measure level of the product is high in order to maintain product quality, conserve resources, improve safety, etc. However, lower cost measurement systems are needed in order to allow a plant to instrument its measurements fully.

Further, there are certain process measurement applications that demand other than conventional measurement approaches. For example, applications demanding high temperature and high pressure capabilities during level measurements must typically rely on capacitance measurement. However, conventional capacitance measurement systems are vulnerable to errors induced by changing material characteristics. Further, the inherent nature of capacitance measurement techniques prevents the use of such capacitance level measurement techniques in vessels containing more than one fluid layer.

Ultrasonic time-of-flight technology has reduced concerns regarding level indications changing as material characteristics change. However, ultrasonic level measurement sensors cannot work under high temperatures, high pressures, or in vacuums. In addition, such ultrasonic sensors have a low tolerance for acoustic noise.

One technological approach to solving these problems is the use of guided wave pulses. These pulses are transmitted down a dual probe transmission line into the stored material, and are reflected from probe impedance changes which correlate with the fluid level. Process electronics then convert the time-of-flight signals into a meaningful fluid level reading. Conventional guided wave pulse techniques are very expensive due to the nature of equipment needed to produce high-quality, short pulses and to measure the time-of-flight for such short time events. Further, such probes are not a simple construction and are expensive to produce compared to simple capacitance level probes.

Recent developments by the National Laboratory System now make it possible to generate fast, low power pulses, and time their return with very inexpensive circuits. See, for example, U.S. Pat. Nos. 5,345,471 and 5,361,070. However, this new technology alone will not permit proliferation of level measurement technology into process and storage measurement applications. The pulses generated by this new technology are broadband, and also are not square wave pulses. In addition, the generated pulses have a very low power level. Such pulses are at a frequency of 100 Mhz or higher, and have an average power level of about 1 nano Watt or lower. These factors present new problems that must be overcome to transmit the pulses down a probe and back and to process and interpret the returned pulses.

The present invention relates to a sensor apparatus for transmitting these low power, high frequency pulses down a probe and effecting their return. Currently, no industrially suitable sensor exists which can economically function as a transmission line and withstand typical industrial process and storage environments, while maintaining vessel integrity.

The present invention relates to a single conductor surface wave transmission line (Goubau line) adapted as a sensor for industrial process variable measurement. The present invention incorporates not only the transmission line function, but also a reference pulse means, a sensing function, a process connection mounting function, a sensor fixing means, and a process sealing means all in a single construction which is compatible with standard industrial mounting requirements such as flanges or threaded connections. The apparatus of the present invention also meets the heavy duty demands of an industrial environment and is suitable for installation in areas of high temperature, high humidity, high pressure, high chemical aggressiveness, high static electricity, high pull-down forces in granular materials, and high electromagnetic influence. The sensor apparatus is connected electrically to a process measurement system electronics which provides its power and signal processing. The sensor apparatus is specifically designed to handle high speed, low power, high frequency broadband pulses which are delivered by the system electronics.

The sensor apparatus of the present invention is particularly adapted for the measurement of material levels in process vessels and storage vessels, but is not thereto limited. It is understood that the sensor apparatus may be used for measurement of other process variables such as flow, composition, dielectric constant, moisture content, etc. In the specification and claims, the term "vessel" refers to pipes, chutes, bins, tanks, reservoirs, or any other storage vessels. Such storage vessels may also include fuel tanks, and a host of automotive or vehicular fluid storage systems or reservoirs for engine oil, hydraulic fluids, brake fluids, wiper fluids, coolant, power steering fluid, transmission fluid, and fuel.

The present invention propagates electromagnetic energy down an inexpensive, single conductor transmission line as an alternative to conventional coax (or otherwise dual) cable transmission lines. The Goubau line lends itself to applications for a level measurement sensor where an economical rod or cable probe (i.e., a one conductor instead of a twin or dual conductor approach) is desired. The single conductor approach enables not only taking advantage of new pulse generation and detection technologies, but also constructing probes in a manner similar to economical capacitance level probes.

As discussed above, the simplest implementations of a single transmission line in a process measurement probe will not withstand the previously discussed rigors of an industrial environment. Further, standard capacitance level probes do not accommodate the transmission of high speed pulses due to the electrical impedance discontinuities which exist in their assembly.

The present invention solves problems associated with implementing the new, inexpensive pulse technology by providing an improved mounting, fixing, securing, and sealing sensor apparatus including the combination of a probe element and transmission line. The present invention accomplishes these features while maintaining the electrical operation of a Goubau line including pulse launch, smooth impedance transition from cabling, reference pulse control, transmission through the mounting including both transmitted pulse control and reflected pulse control, and facilitation of desired mode propagation.

According to one aspect of the invention, a sensor apparatus is provided for transmitting electrical pulses from a signal line into a vessel to measure a process parameter. The sensor apparatus includes a housing having upper and lower mounting sections. The lower mounting section is formed to include a tapered surface adjacent the bottom end of the lower mounting section. The apparatus also includes a conductive probe element including a head having a tapered surface and an elongated conductive portion extending away from the head. The tapered surface of the head is configured to engage the tapered surface of the lower mounting section to prevent movement of the probe element in a direction toward the mounting section. A dielectric insert is located above the head of the conductive probe element and a conical transitioning pin has a lower flange configured abut the dielectric insert and a threaded member for coupling the pin to the probe element to secure the probe element to the mounting section.

In the illustrated embodiment, a spring is located between the dielectric insert and a flange of the mounting section to provide an upwardly directed biasing force to the dielectric insert, the pin and the probe element. The apparatus further includes an electrical connector coupled to the conical transitioning pin. The connector is configured to couple the signal line to the probe element.

According to another aspect of the invention, a sensor apparatus is provided for transmitting electrical pulses from a signal line into a vessel to measure a process parameter. The sensor apparatus includes a mounting section configured to be coupled to the vessel and a conductive probe element having a predetermined diameter. The probe element is formed to include a section have a reduced diameter adjacent the top end of the probe element. The probe element includes a tapered section providing transition from the probe element to the reduced diameter section.

In the illustrated embodiment a dielectric insert is located within the mounting section. The dielectric insert includes an inwardly tapered section to prevent movement of the probe element in a direction toward the mounting section and an outwardly tapered section.

Also in the illustrated embodiment, a conductive pin is coupled to the top end of the probe element. The conductive pin has a larger diameter than the diameter of the reduced diameter section of the probe element to engage the outwardly tapered section of the dielectric insert to prevent movement of the probe element in a direction away from the mounting section. An electrical connector is coupled to the pin and is configured to couple the signal line to the probe element through the conductive pin.

According to a further aspect of the invention, a sensor apparatus is provided for transmitting electrical pulses from a signal line into and out of a vessel to measure a process variable. The sensor apparatus includes a mounting section configured to be coupled to the vessel. The mounting section is formed to include a central aperture defined by a first tapered surface. A dielectric insert has a second tapered surface configured to engage the first tapered surface of the mounting section to prevent movement of the dialectic insert in a direction away from the mounting section. The dialectic insert also has a third tapered surface.

In the illustrated embodiment, a conductive transitioning pin has a fourth tapered surface configured to engage the third tapered surface of the dialectic insert.

Also in the illustrated embodiment, a metallic insert is located above the transitioning pin and the dielectric insert. The metallic insert is coupled to the mounting section to secure the dielectric insert within the mounting section. A conductive, flexible or rigid probe element is coupled to the transitioning pin and extends downwardly through the dielectric insert and into the vessel. An electrical connector is coupled to the transitioning pin and is configured to couple the signal line to the probe element through the transitioning pin.

In each of the illustrated embodiments at least one of the transitioning pins and the connector includes an aperture and the other of the transitioning pin and the connector include a pin which slidably engages the aperture to permit movement of the probe element relative to the mounting section while maintaining the electrical connection.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
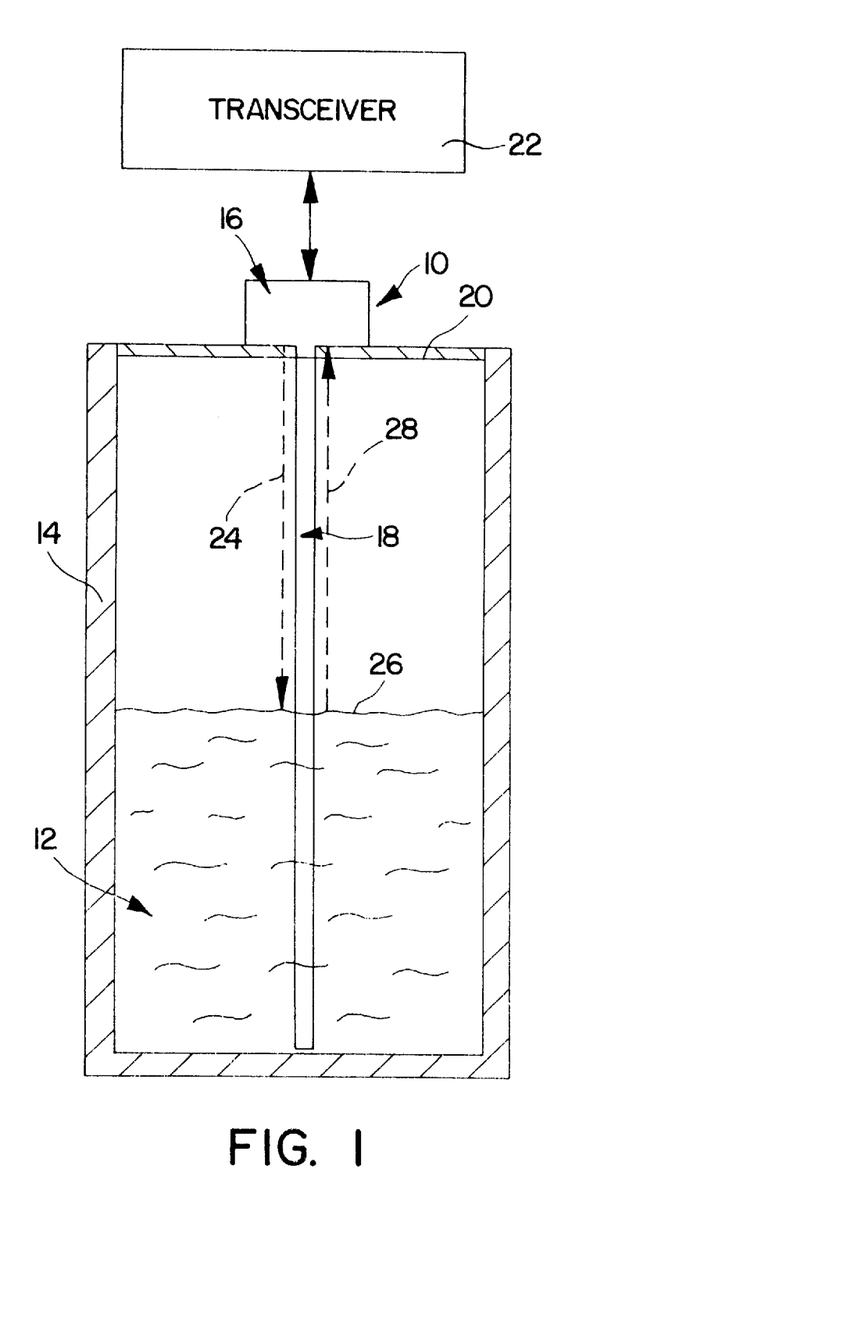
FIG. 1 is a diagrammatical view illustrating a single conductor material level sensor for measuring the level of a process variable such as a liquid in a vessel.

Referring now to the drawings, FIG. 1 is a diagrammatical illustration of operation of the surface wave transmission line sensor apparatus for process measurement. The apparatus 10 is adapted for use with level measurement of a process variable such as a liquid 12 stored within a storage vessel 14.

The present invention includes a mechanical mounting apparatus 16 for securing a single conductor transmission line 18 to a top surface 20 of the vessel 14. (See vessel flange 34 in FIG. 2.) The mechanical mounting structure 16 also provides a sealing feature as discussed in detail below. The mechanical mounting apparatus 16 enables a transceiver 22 to transmit pulses down the single conductor 18 in the direction of arrow 24. Once the pulses reach a top surface 26 of liquid 12, a reflective pulse 28 is returned back up the conductor 18 in the direction of arrow 28.

The transceiver 22 includes processing circuitry which detects the reflected pulses to interpret the return pulses and to generate an output signal indicating the level of liquid 12 in the vessel 14. Preferably, the transceiver 22 transmits broadband pulses at a very low power level, such as about 1 nW or less average power, or 1 $\mu$W or less peak power. The frequency of the pulses is preferably about 100 Mhz or greater.

The present invention is concerned with the mechanical mounting apparatus 16. The improved surface wave transmission line sensor apparatus of the present invention provides several functions for the process level measurement. The first function is a mounting function for securing the sensor apparatus to the vessel, pipe, chute, bin, or other process environment. A second function of the sensor apparatus of the present invention is to provide a seal between an interior region of the vessel and the environment. Yet another function of the sensor apparatus of the present invention is to provide a functional broadband transmission line which permits broadband, low power pulses to be transmitted down a single conductor transmission line.

Figure 2:
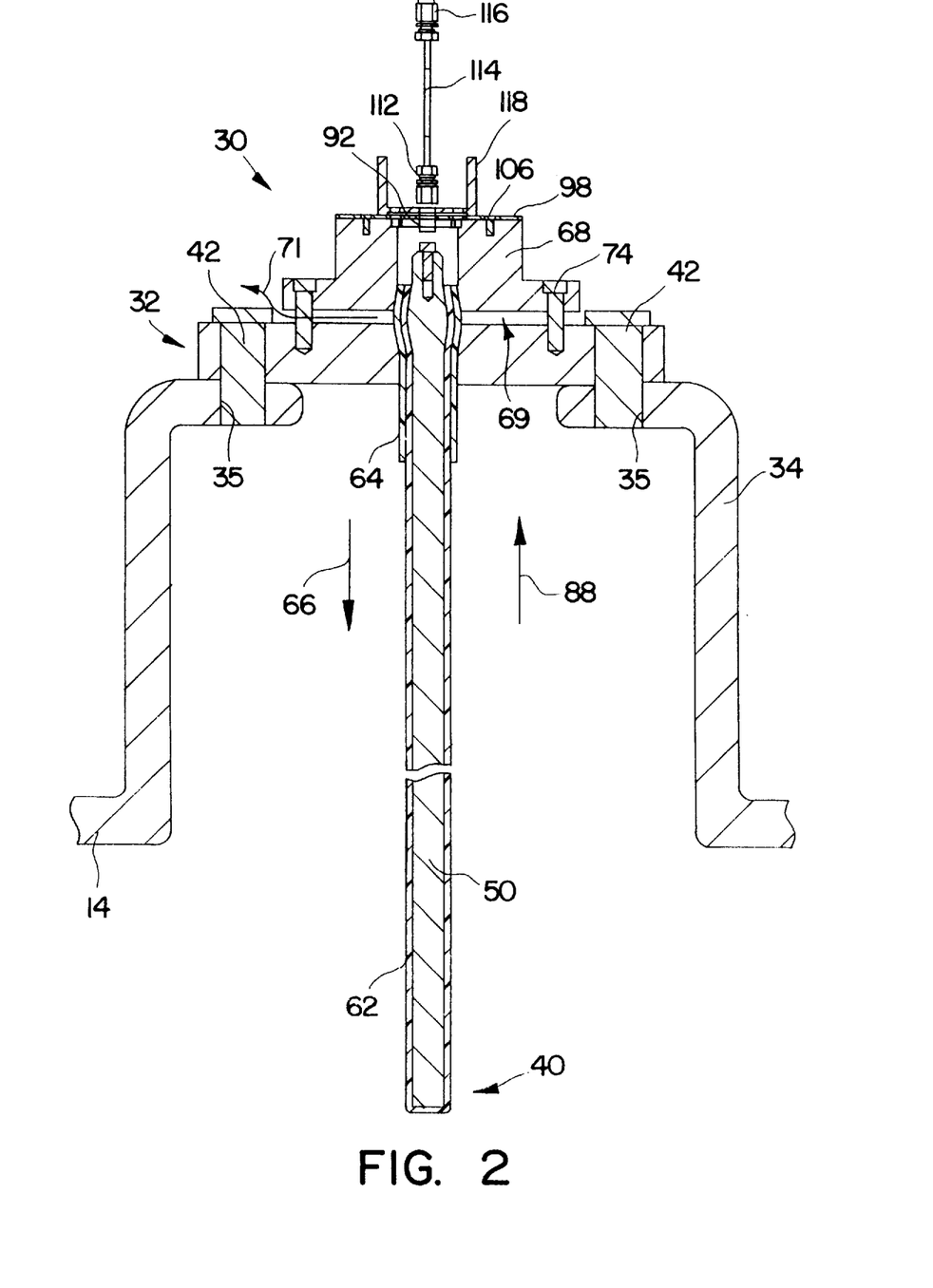
FIG. 2 is a sectional view illustrating a first illustrated embodiment of the present invention mounted on a tank flange of a vessel.
Figure 3:
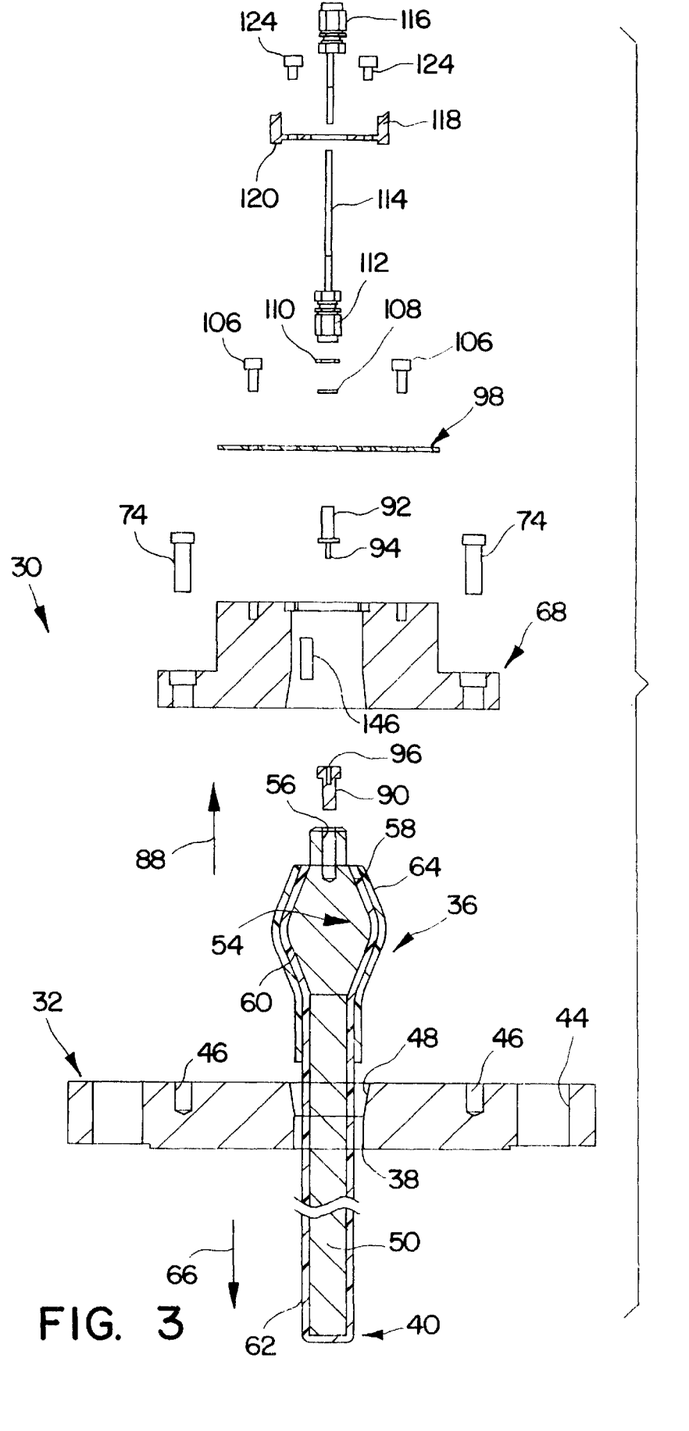
FIG. 3 is an exploded sectional view of the apparatus of FIG. 2.

Details of the apparatus of the present invention are illustrated in FIGS. 2 and 3. The entire mechanical assembly is referred to as sensor 30. Sensor 30 includes a process connection or lower flange 32 for securing the sensor 30 to a mounting flange 34 on the vessel 14. Sensor 30 also includes a probe element 36 which is inserted through an aperture 38 formed in lower flange 32 so that a distal portion 40 of the probe 36 extends into the vessel 14 to provide a single conductor. Lower flange 32 is coupled to the flange 34 of the vessel by suitable fasteners 42 which extend through apertures 44 formed in lower flange 32 and apertures 35 formed in flange 34. It is understood that the lower flange 32 can have a reduced diameter with a threaded outer portion to provide a threaded connection to the vessel flange 34, if desired.

Figure 4:
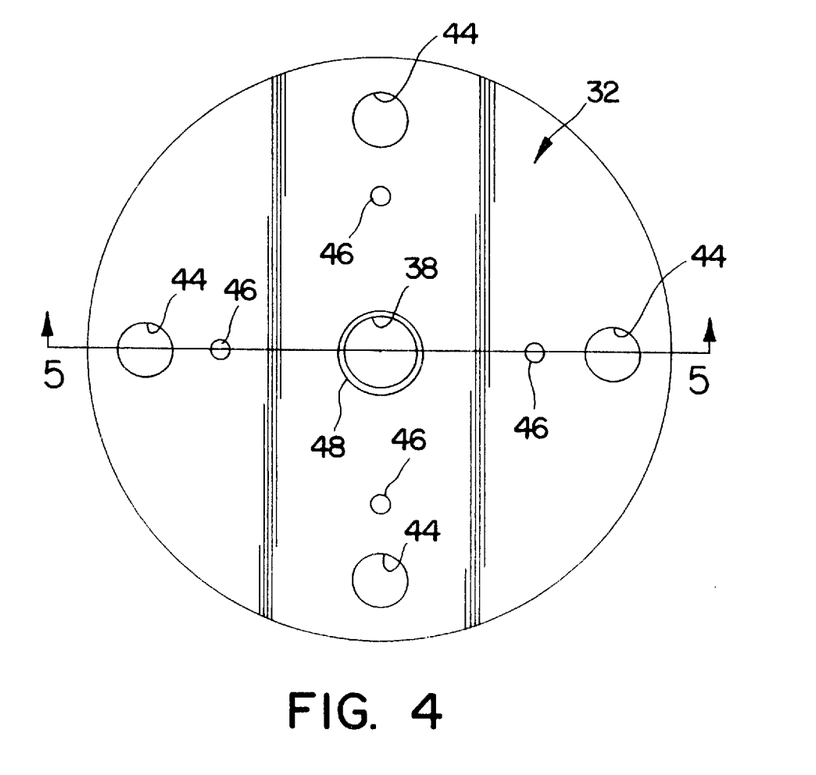
FIG. 4 is a top plan view of a lower process connection flange for connecting the sensor apparatus of the present invention to the tank flange.
Figure 5:
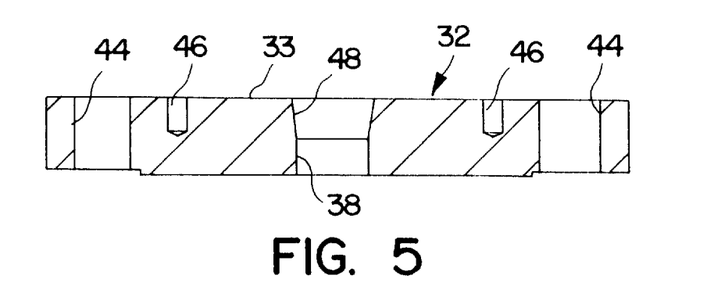
FIG. 5 is a sectional view taken along lines 5—5 of FIG. 4.

Lower flange 32 is best illustrated in FIGS. 4 and 5. Lower flange 32 includes four spaced apart threaded apertures 46. A central aperture 38 for receiving the probe element 36 is formed to include an outwardly tapered upper surface 48 to improve sealing of and to provide a smooth impedance transition of the probe element 36 as discussed in detail below. Tapered surface 48 is convergent in a direction extending downwardly from the top surface 33 of lower flange 32. Preferably, flange 32 is made form stainless steel or other metal material. It is understood that flange 32 may be made from another corrosive resistant nonconductive material in accordance with the present invention.

Figure 6:
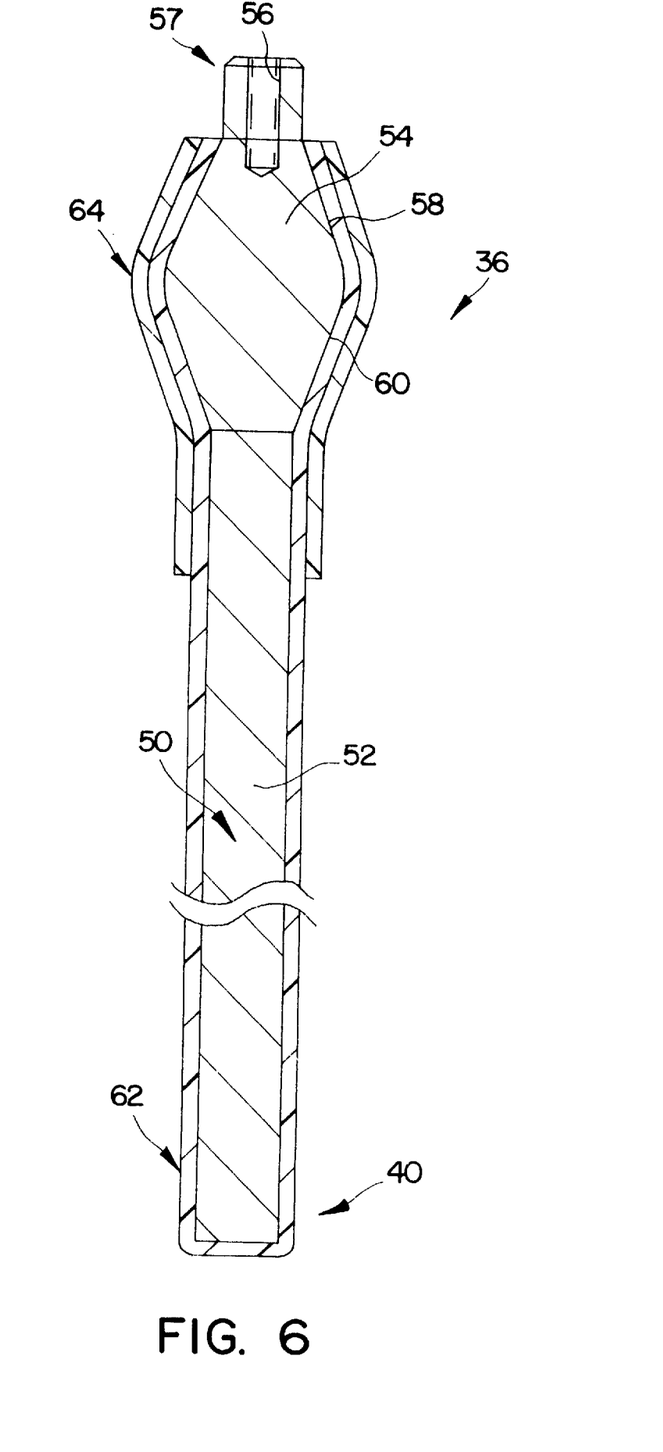
FIG. 6 is a sectional view of a single conductor probe element.

Probe element 36 is best illustrated in FIG. 6. The probe element 36 includes a single inner conductor 50 made from stainless steel or another metal material having an elongated, generally cylindrical body portion 52 and a head portion 54 having an increased diameter. Head portion 54 includes a threaded aperture 56 and outwardly tapered surfaces 58 and 60. Tapered surface 58 is a divergent conical surface extending in a direction downwardly from top end 57 of probe. Tapered surface 60 is a convergent conical surface extending in a direction downwardly from tapered surface 58.

Preferably, the entire conductor 50 is coated with at least one layer of Teflon 62 or other insulative material. In the illustrated embodiment, a second layer of Teflon 64 is added near the head portion 54 of conductor 50. It is understood that this area of increased thickness 64 may be excluded or that the Teflon coating may be single layer having an increased thickness adjacent head portion 54, or may be an alternate material.

The probe element 36 is inserted downwardly through aperture 38 formed in lower flange 32 so that the lower tapered surface 60 of head 54 engages the tapered portion 48 of aperture 38. Cooperation of tapered surface 48 of lower flange 32 with tapered surface 60 of probe element 36 provides increased retention force for the probe element 36 to prevent probe element 36 from being forced into the vessel 14 in the direction of arrow 66 by either external pressure outside the vessel 14, or vacuum or mechanical force inside the vessel 14. Tapered surfaces 48 and 60 also provide a seal between the probe 36 and the lower flange 32.

The probe element 36 of the present invention functions as the conductor for a single line surface wave transmission line. The illustrated probe element 36 is constructed of a metal rod 50 as discussed above. In other embodiments, the probe element 36 may be constructed from a cable, wire, wire rope, or any other conductive linear element whether flexible or rigid. The probe element 36 can have a round or other cross-sectional shape, and can be coated (sheathed) or uncoated. In the present invention, such a probe element would include a head similar to head 54 with the conductive cable or other conductor extending downwardly from the head. The distal end 62 of probe element 36 is important in providing information related to system calibration, and compensation factors. In addition, the termination of distal end 62 can affect how well the sensor functions relative to process materials which contact the sensor in the direct area where the termination exists. The present design allows for various terminations while preserving the sensor function. For example, a ballast weight may be provided on cable-type probes. Special ballast design or rod tip constructions can improve information from the probe tip. The termination techniques also include the possibility of mechanically and electrically coupling the distal end of probe element 36 to the vessel 14.

Figure 7:
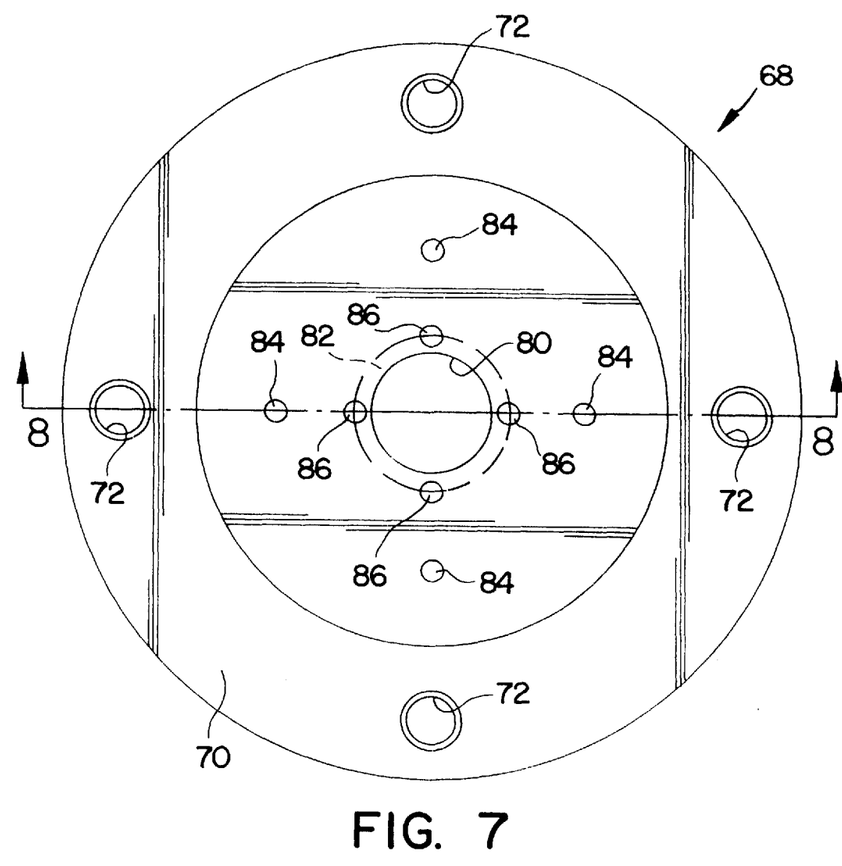
FIG. 7 is a top plan view of an upper mounting flange or standoff of the present invention.
Figure 8:
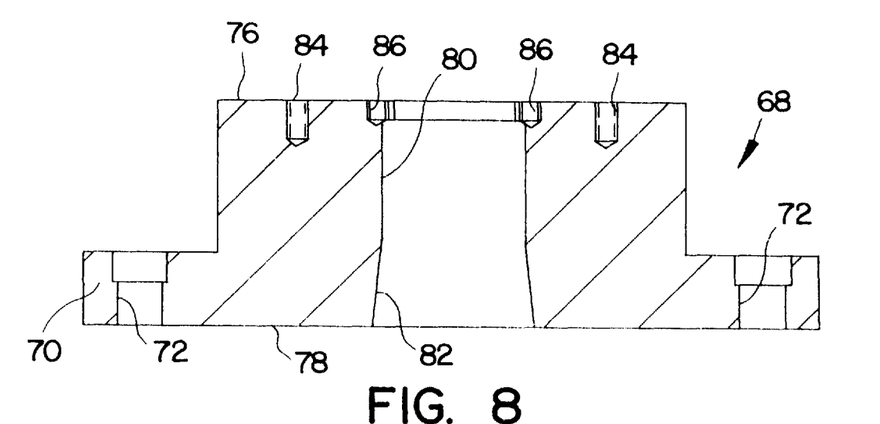
FIG. 8 is a sectional view taken along lines 8—8 of FIG. 7.

Referring again to FIGS. 2 and 3, an upper flange 68 is positioned over probe element 36 to secure the probe element 36 to the lower flange 32. Details of the upper flange 68 are illustrated in FIGS. 7 and 8. Upper flange 68 includes a mounting portion 70 formed to include apertures 72. Stainless steel screws 74 extend through apertures 72 and are threaded into threaded apertures 46 of lower flange 32 to secure the upper flange 68 to the lower flange 32. Upper flange 68 includes a top surface 76 and a bottom surface 78. A central aperture 80 extends between the top surface 76 and bottom surface 78 of upper flange 68. Aperture 80 includes an outwardly expanded, tapered surface 82 located adjacent bottom surface 78. Tapered surface 82 is convergent in a direction extending upwardly from bottom surface 78. A first set of threaded apertures 84 is formed in top surface 76 of upper flange 68. A second set of threaded apertures 86 is also formed in top surface 76 of upper flange 68. The apertures 86 are spaced radially inwardly from the first set of apertures 84.

The tapered surface 82 of upper flange 68 engages the probe element 36 adjacent the tapered surface 58 of head 54. Cooperation of these tapered surfaces 82 and 58 prevent movement of the probe element 36 in the direction of arrow 88 due to high pressure inside the vessel 14 and to provide a seal between the probe 36 and the upper flange. Preferably, upper flange 68 is made from stainless steel or other metal material. It is understood that flange 68 may also be made from another corrosive resistant, nonconductive material in accordance with the present invention.

The upper and lower flanges 32 and 68 cooperate to rigidly fix or secure the probe element 36 to the process connection such as flange 34 of vessel 14. Probe element 36 is secured to vessel 14 with sufficient mechanical integrity to withstand high temperature, high humidity, and high pressure. Cooperation of tapered surface 48 on lower flange 32 with tapered surface 60 on probe element 36 and cooperation of tapered surface 82 of upper flange 68 with tapered surface 58 of probe element 36 prevent outward movement of the probe element 36 relative to the upper and lower flanges 68 and 32 which might otherwise be caused by positive process pressures. The cooperation of the tapered surfaces also prevents inward or downward movement of the probe element 36 which might otherwise be caused by negative process pressure, gravity, or process forces such as viscosity, friction, turbulence, mechanical contact with agitators, etc.

The configuration of lower flange 32, probe element 36, and upper flange 68 also provide a process seal to minimize or prevent leakage of process materials such as gas, liquid, or particulate matter out of the containment vessel 14. The improved sealing arrangement of sensor apparatus 30 also prevents or minimizes the ingress of outside elements when the vessel is at low pressure. Such sealing is accomplished by sealing materials which fill spaces or gaps between electrical and mechanical elements tightly. For instance, by coating the probe element 36 with Teflon layers 62 and 64, an improved seal is obtained between the probe element 36 and upper and lower flanges 68 and 32.

The sensor apparatus 30 provides long term integrity of the seals under a wide range of temperature, pressure, and chemical exposure. Such sealing is also directed at non-pressurized vessels, where a pressure vector may be created by atmospheric conditions, conditions of fluid head pressure due to submersion of the mounting, or from process failures such as failed venting. The sealing surfaces are created between the metallic surfaces of the lower and upper flanges 32 and 68 and the metallic surfaces of the probe element 36 by using inert plastics, elastomers, or other dielectric materials such as Teflon coatings 62 and 64 which are suitable for pressures, temperatures, and chemicals encountered.

Referring again to FIGS. 2 and 3, a stainless steel screw 90 is threaded into threaded aperture 56 of probe element 36. A high frequency electrical connector 92 having a center conductor 94 is coupled to an opening 96 formed in the threaded screw 90 for receiving conductor 94. For example, high frequency connector 92 is an SMA connector.

Figure 9:
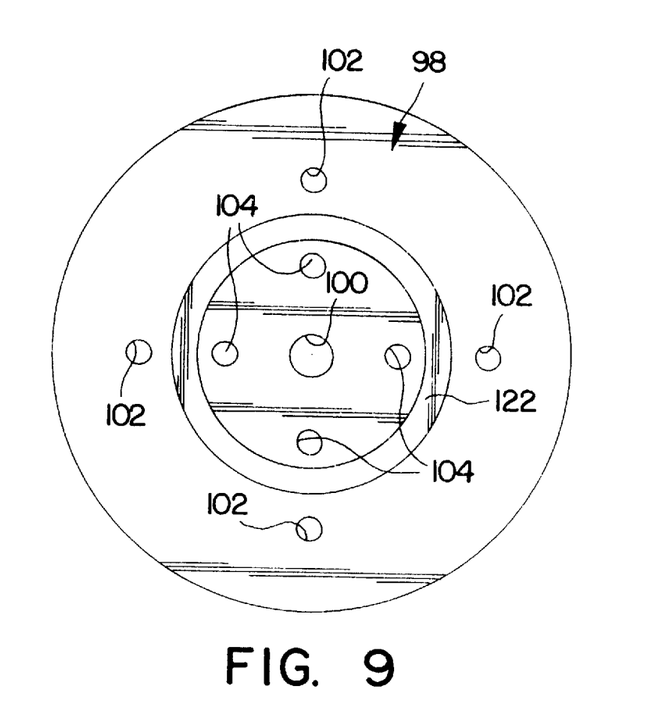
FIG. 9 is a top plan view of a launch plate of the present invention.

A stainless steel launch plate 98 includes a central aperture 100 which is positioned over high frequency connector 92. The configuration of launch plate 98 is best illustrated in FIG. 9. Launch plate 98 includes an outer set of apertures 102 and an inner set of apertures 104. Outer apertures 102 are aligned with apertures 84 formed in upper flange 68. Therefore, launch plate 98 is secured by top surface 76 of upper flange 68 by suitable fasteners 106. A washer 108 and nut 110 are used to secure a central portion of launch plate 98 to the high frequency connector 92.

In another embodiment of the present invention, the upper flange 68 may be formed from a plastic or other nonconductive material. In this instance, the launch plate 98 is still made from metal. However, the launch plate 98 may be coupled to the top surface 76 or the bottom surface 78 of upper flange 68. In addition, the launch plate 98 may be imbedded within the upper flange 68 in this embodiment.

High frequency connector 92 is then coupled to the transceiver and processing electronics by, for example, a first SMA connector 112 which is coupled to high frequency connector 92. A coaxial cable 114 is coupled to connector 112 and to a second SMA connector 116 which is coupled to a processing circuit (not shown) located within an electrical housing 118. Illustratively, electrical housing 118 includes a bottom lip 120 which fits within a groove 122 formed in launch plate 98. Housing 118 is secured to the sensor apparatus 30 by fasteners 124 which extend through apertures of the electrical housing 118, through apertures 104 of launch plate 98, and into threaded apertures 84 in upper flange 68.

The sensor apparatus 30 provides a functional broad band transmission line. A center conductor of the coax cable 114 is coupled to probe element 36 through central conductor 94 of high frequency connector 92. The outer shield conductor of coax cable 114 is electrically coupled to launch plate 98 and upper flange 68. The configuration of lower flange 32, probe element 36, upper flange 68, and launch plate 98 provide a controlled impedance transition from the micro strip transmission line and coax cable 114 to the sensor apparatus 30. These elements provide a transition from a two-wire transmission line to a single wire or conductor transmission line such as probe element 36 while maintaining the mechanical requirements for fixing and sealing the sensor apparatus 30.

The transmission line of the present invention functions like a Goubau launching mechanism. However, the present launching mechanism is different from the classic Goubau cone. The sensor apparatus 30 provides complex topologies, as well as material selections, to provide an apparatus which can simultaneously mount and seal the sensor while providing a launching mechanism for the pulses.

A controlled impedance transition between the line 114 and the sensor 30 provides an initial reflection to provide a reference return pulse to the system electronics. The sensor 30 creates an inherent complex impedance mismatch as a transition from the cable 114 to the sensor 30. This impedance mismatch eliminates the need for a "zero time" detection at the initiating of the pulse itself by creating a reference pulse which occurs, in time, significantly later than the initiating pulse. As the signal leaves the 50 ohm cable 114, the impedance changes as the signal enters the sensor apparatus 30. The present invention does not require the use of a resistor or other impedance network to provide the reference reflective signal.

The present invention provides a smooth impedance transition after the initial change so that the pulse continues down the probe element 36. Tapered surface 82 of upper flange 68 and tapered surface 58 of probe element 36 provide a smooth impedance transition. In addition, tapered surface 60 of probe element 36 and tapered surface 48 of lower flange 32 also provide a smooth impedance transition to reduce the effect of such impedances on the transmitted signal. Therefore, the configuration of the sensor apparatus 30 provides spacial distribution control so that no abrupt changes in impedance are encountered by the signal. Abrupt diameter changes of the components are minimized in the upper and lower flanges 68 and 32 or the probe element 36 to minimize impedance changes.

Figure 10:
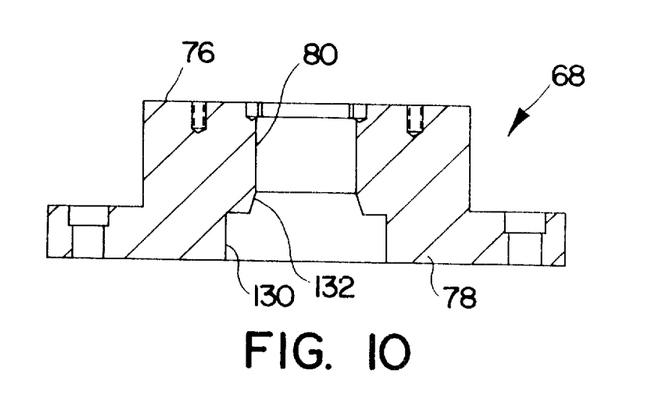
FIG. 10 is a sectional view taken through an alternative embodiment of the upper mounting flange of the present invention.
Figure 11:
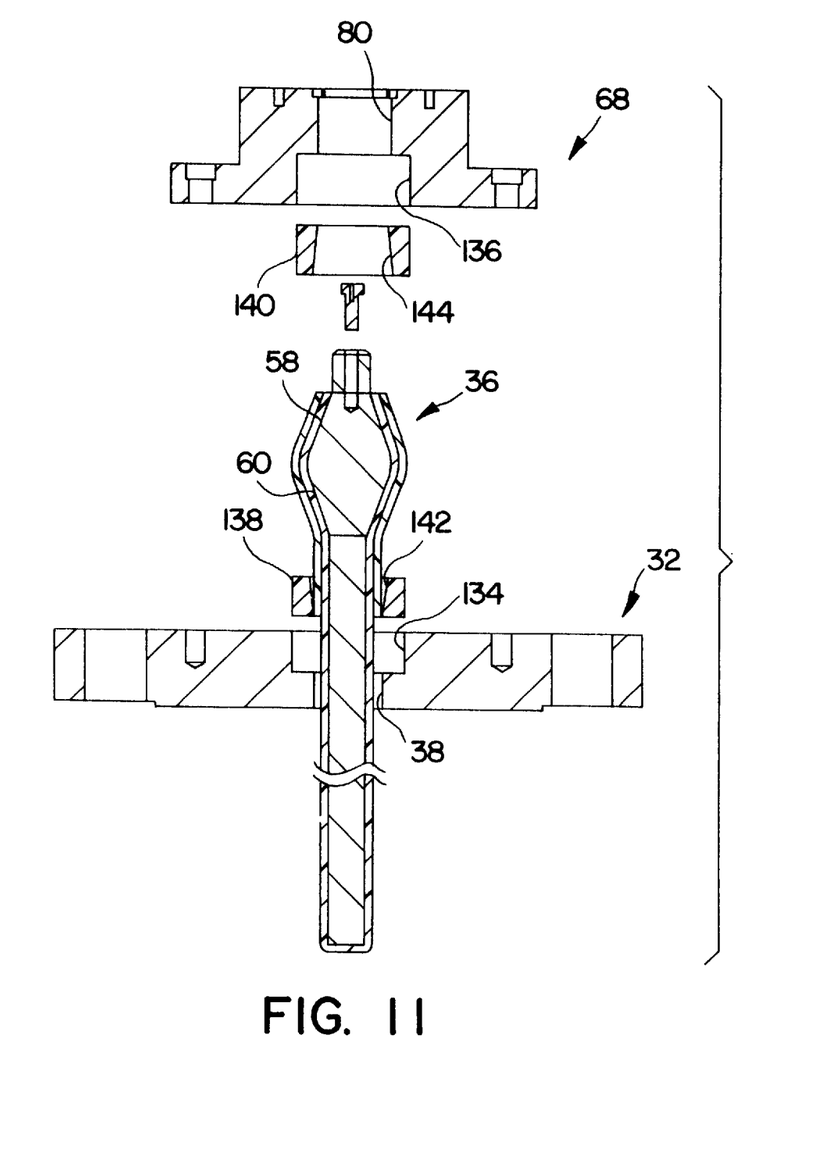
FIG. 11 is an exploded sectional view of another illustrated embodiment of the present invention in which the upper and lower mounting flanges have been modified.

Therefore, the present invention optimizes sensor impedances not just at the transition between the cable 114 and the sensor 30, but all the way through the sensor 30. Impedances through the sensor apparatus 30 are controlled by specific geometries. Such optimization is important with low power, high frequency pulse signals to ensure maximum energy transferred to the probe element 36 by controlling or minimizing undesired reflections of pulsed energy. The sensor 30 incorporates mechanical features which optimize the total impedance of the sensor to a degree without which the transmission of energy would be severely limited. These features include, but are not limited to, spacings, material selection, shape, gas filled interstices. Such interstices, which are the size and shape of spacings between the parts, is a critical element. When signals from the process are very good, a version of the sensor apparatus illustrated in FIGS. 2–9 is sufficient. For improved performance, however, cavities or interstices are created in the flanges 32 and 68 as illustrated in FIGS. 10 and 11. These cavities further lower the impedance through the mounting.

The transmitted pulse and the reflected pulse characteristics are controlled via the impedances determined by the geometries of the launch plate 98, upper flange 68, lower flange 32 and probe element 36. Such characteristics include, but are not limited to, pulse width, amplitude, rise time, fall time, and polarity. Sensor apparatus 30 also minimizes, controls, or eliminates unwanted pulse reflections via impedances determined by these geometries.

As illustrated in FIG. 10, the upper flange 68 may be formed to include an expanded cavity 130 adjacent bottom surface 78. A relatively short tapered surface 132 provides a transition between aperture 80 and expanded cavity 130. In the FIG. 10 embodiment, tapered surface 132 is configured to engage tapered surface 58 of probe element 36. It is understood that lower flange 36 may have a configuration similar to the expanded cavity of FIG. 10, if desired.

Another embodiment of the present invention is illustrated in FIG. 11. In this embodiment, lower flange 32 includes an expanded cavity 134 adjacent aperture 38. Upper flange 68 also includes an expanded cavity 136 formed adjacent aperture 80. In certain circumstances, sensor apparatus 30 can be used with the expanded cavities 134 and 136 formed in lower flange 32 and upper flange 68, respectively, without any other components. In other circumstances, the cavities 134 and 136 are filled with a nonconductive material inserts 138 and 140. Illustratively, the inserts are made from PVC, ceramic, or other nonconductive material. In the FIG. 11 embodiment, insert 138 includes a tapered aperture 142 configured to abut tapered surface 60 of probe element 36. Insert 140 includes a tapered aperture 144 configured to engage tapered surface 58 of probe element 36. Inserts 138 and 140 are typically used when high pressure is encountered to prevent movement of the probe element 36 and to provide a larger sealing surface area.

The configuration of sensor apparatus 30 permits the launch plate 98 and the entire sensor 30 to be positioned outside the vessel 14. The external launching mechanism is protected or shielded from vessel-external influences by the complex topology of the sensor 30. The metallic construction of the upper flange 68 and lower flange 32 cooperate to minimize electromagnetic influences upon the launching function of the launch plate 98.

The sensor 30 also permits the addition of a resistive component or complex impedance network to shunt a static charge away from the system circuitry to ground. This is provided by coupling a resistor or impedance network 146 between screw 90 and high frequency connector 92. The resistor or impedance network can be coupled to washer 108 and to another washer which is positioned beneath the head of screw 90. Resistor or impedance network 146 provides a discharge bleeder path to shunt static charge away from the system electronics.

The lower seal provided between tapered surface 48 of lower flange 32 and tapered surface 60 of probe element 36 which is covered by layers 62 and 64 provides a process seal to keep material from entering or exiting from vessel 14. If the lower seal should fail, upper seal provided by tapered surface 82 of upper flange 68 and the coated tapered surface 58 of probe element 36 prevents the escaping material from entering the electronics housing 118. As illustrated in FIG. 2, a space is provided between the bottom surface 78 of upper flange 68 and a top surface 33 of lower flange 32. This space permits any leakage which passes through the lower seal to dissipate from the side of sensor apparatus 30. Therefore, this gap provides a visual indication of any leakage, and a cooling flamepath, pursuant to the National Electrical Code requirement (Article 501).

Figure 12:
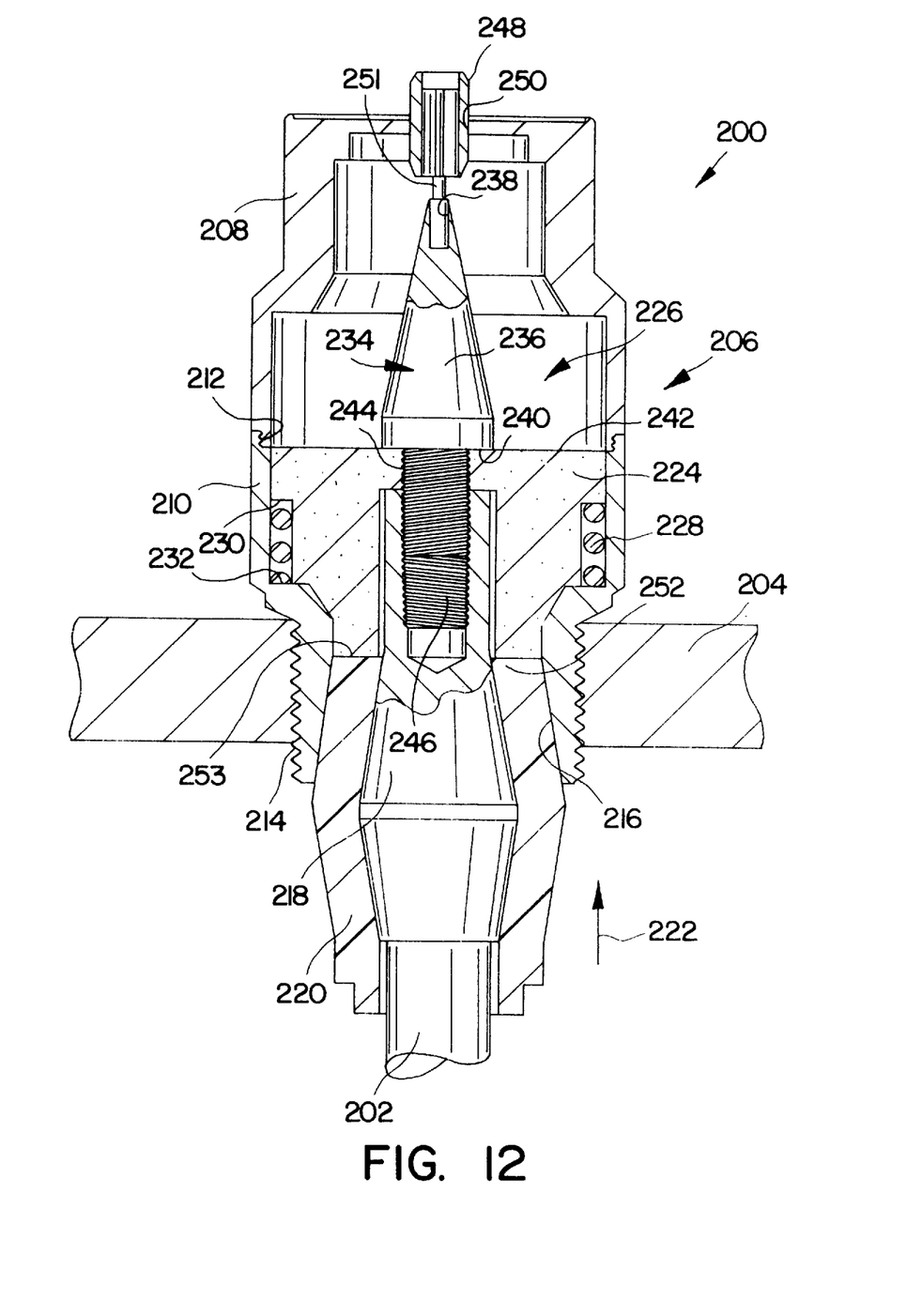
FIG. 12 is a sectional view of another illustrated embodiment of the sensor apparatus of the present invention for mounting a probe element to a vessel.

Another embodiment of the present invention is illustrated in FIG. 12. The sensor apparatus 200 is configured to mount a probe element 202 to a vessel 204. Sensor apparatus 200 includes a housing 206 having an upper gland mounting section 208 and a lower gland mounting section 210. The upper and lower mounting sections 208 and 210 are preferably made from stainless steel. It is understood that mounting sections 208 and 210 may also be made from another corrosive resistant material in accordance with the present invention. The internal surfaces and dimensions of housing 206 are selected to provide desired impedances as previously discussed. Upper mounting section 208 is threadably coupled or welded to lower mounting section 210 by threads or groove 212.

Lower mounting section 210 includes a threaded portion 214 to permit a pipe thread connection between sensor apparatus 200 and the vessel wall 204. Lower mounting section 210 is formed to include a tapered aperture 216 for engaging an upper, outwardly tapered surface 218 of probe element 202. Preferably, the upper end of probe element 202 includes an insulation layer 220. Insulation layer 220 is preferably Teflon. The tapered section 216 of lower mounting section 210 engages the outwardly tapered section 218 covered with insulation 220 to prevent movement of the probe element in the direction of arrow 222.

Sensor apparatus 200 further includes a dielectric material insert 224 located within housing 206. Preferably, insert 224 is made from plastic or ceramic material. Dielectric insert 224 performs both a mechanical and electrical function by providing the desired impedance. The desired impedance is determined by material selection and shape of the insert 224. Housing 206 includes an open air portion 226 located above the dielectric material 224. In an alternative embodiment, region 226 can be filled with another dielectric material such as plastic or ceramic, if necessary, to improve the high frequency transmission of signals to the probe element 202 as discussed below. In either case, the shape and dimension of region 226 is selected to optimize the desired impedance.

A spring 228 is located between an outer flange 230 of dielectric material insert 224 and a bottom flange 232 of lower mounting section 210. Therefore, spring 228 applies an upwardly directed biasing force to dielectric material insert 224 in the direction of arrow 222.

Probe element 202 is coupled to dielectric material insert 224 by a threaded conical pin 234. Pin 234 is preferably made from stainless steel, but other corrosive resistant materials could be used. Pin 234 includes a conical body section 236 having an aperture 238 formed in an upper end. The conical body section 236 is shaped to optimize its impedance relationship to its surroundings. Pin 234 includes a lower flange 240 configured to engage a top surface 242 of dielectric insert 224. Pin 234 also includes a threaded member 244 configured to be coupled to an upper threaded section 246 of probe element 202 to secure the probe element 202 to the insert 224.

A high frequency connector 248, preferably SMA or BNC type connector is located within an aperture 250 of upper mounting section 208. High frequency connector 248 includes a pin 251 located within aperture 238 of conical pin 234. Therefore, the pin 251 is slidable within the aperture 238 to permit some movement of the probe element 202 relative to the housing 206. For instance, the probe element may move slightly upwardly in the direction of arrow 222 due to thinning of the insulative layer 220, upwardly directed pressure, or spring action. The pin 251 is free-floating within the aperture 238 or alternately within a female portion of high frequency connector 248 (SMA or BNC). It will be understood that with a female connector 248 an aperture would be formed in connector 248 and a pin would be located on conical pin 234. Therefore, if the probe element 202 moves up or down relative to the housing 206, the pin 251 slides within the aperture 238 to maintain the electrical connection between the connector 248 and the probe element 202.

In contrast to the embodiment of FIGS. 1–11, only the upward tapered section 218 of the probe element 202 engages the lower mounting section 210. The probe element 202 is held in place by the conical transitioning pin 234. The pin 234 engages the top surface 242 of the dielectric insert 224, and a top surface 253 of probe element 202 engages a bottom surface 252 of the dielectric insert 224. When the threaded element 244 is tightened within threaded section 246 of probe element 202, the tapered section 218 is moved upwardly in the direction of arrow 222 so that the insulation 220 above tapered section 218 engages the tapered section 216 of lower mounting section 210. Spring 228 provides a biasing force in the direction of arrow 222 to insure that the probe element 202 is sealed against the conical surface 216 of lower mounting section 210. For instance, if the insulation layer 220 thins during use, spring 228 will move the probe element 202 upwardly to reseal the probe element against the tapered surface 216.

The sensor apparatus 200 permits transmission of high frequency, TDR signals from the high frequency connector 248 to the probe 202. Impedances of the elements of sensor apparatus 200 are selected to control the rate of change of impedance on the high frequency signal. The spacing between the components of sensor 200 is also selected to minimize abrupt impedance changes which effects signal transmission. For instance, the angle of conical section 236 can be changed, if desired. In addition, the dielectric constant of the dielectric insert 224 may also be adjusted. A dielectric material may be located within open region 226 of housing 206.

The sensor apparatus 200 provides process-reliable strain relief for a high frequency connection to the TDR probe element 202. The structure of sensor apparatus 200 enables the probe element 202 to be mounted in a small, threaded mounting to the vessel 204. Sensor apparatus 200 further provides a sufficient sealing surface and flame path length for hazardous locations.

Figure 13:
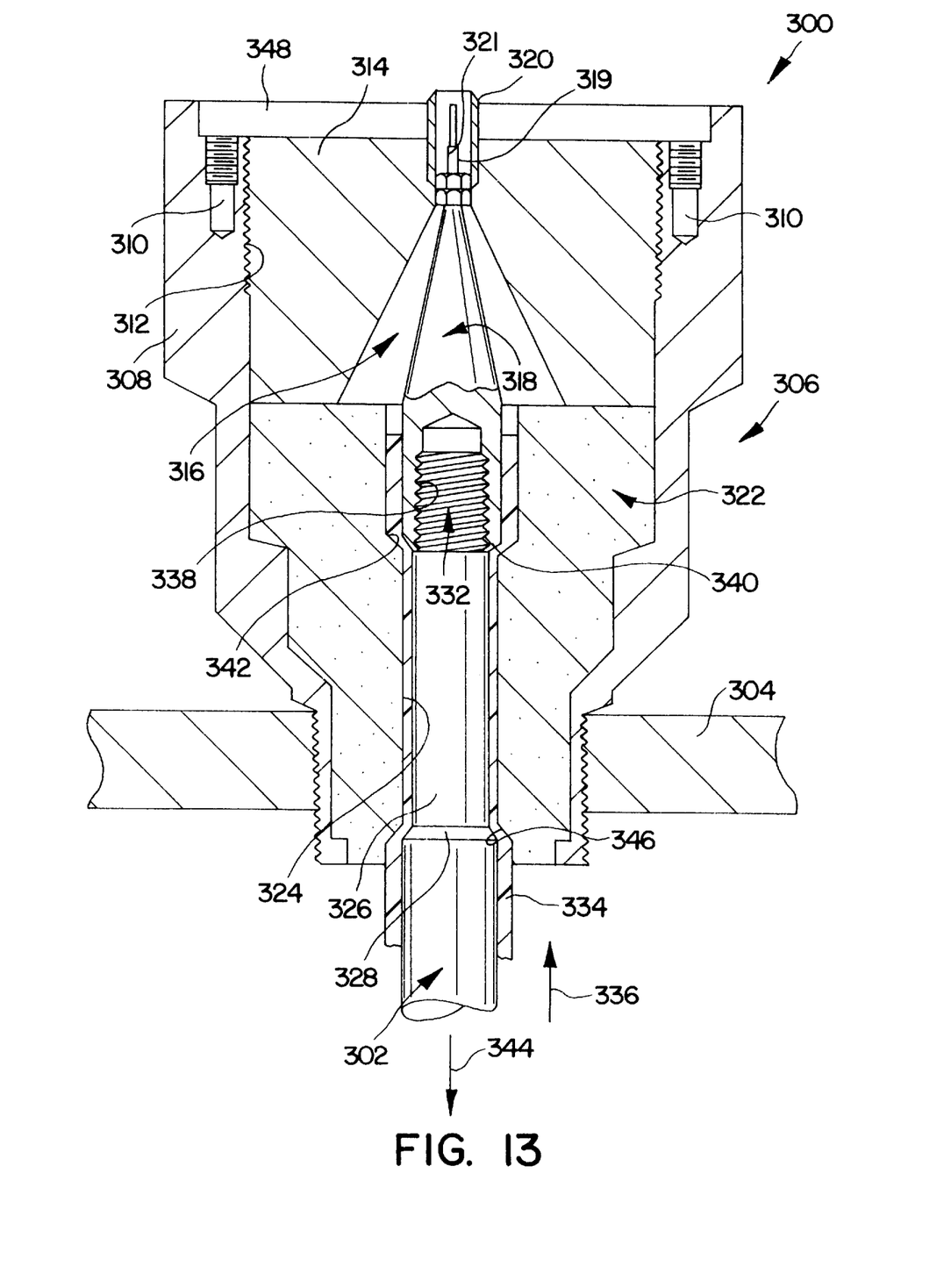
FIG. 13 is a sectional view illustrating yet another embodiment of a sensor apparatus for mounting a probe element to the vessel.

Another embodiment of the present invention is illustrated in FIG. 13. The sensor apparatus 300 is provided for coupling a probe element 302 to a vessel 304. The embodiment of FIG. 13 uses an "inverted" taper to secure the probe element to a housing 306. Housing 306 is formed by an upper gland section 308 which is made from stainless steel. Again other corrosive resistant materials could be used. Gland section 308 includes upper threaded or grooved apertures 310 and an internal threaded section 312. The internal surfaces and dimensions of housing 306 are selected to provide desired impedances. A metallic insert 314 is threaded into gland section 308 or alternately may be snapped in and held with a spring element and retaining ring (not shown). Preferably insert 314 is stainless steel. Metallic insert 314 includes an air-filled conical cavity 316. Cavity 316 may be filled with another dielectric material, if necessary. The conical shape of cavity 316 is selected to provide desired impedances.

A conical steel nut 318 is located within cavity 316. The conical steel nut 318 is shaped to optimize its impedance relationship to its surroundings. A high frequency electrical connector 320, preferably an SMA or BNC connector, is coupled to a top end of conical nut 318 via an upper decreased diameter pin 319 which is slidable within an aperture 321 in connector 320 to permit some movement of probe element 302. Again the location of the aperture 321 and pin 319 could be reversed. A lower dielectric insert section 322 is also located within gland section 308. Lower dielectric insert 322 includes an internal aperture 324, and has a shape, dimension and material selected to provide the desired impedance.

Probe element 302 is formed to include a section 326 having a reduced diameter. A tapered section 328 is formed at one end of reduced-diameter section 326 of probe element 302. Probe element 302 further includes a male threaded member 332 at a top end. An insulative material 334, such as Teflon, is preferably located on the outside of probe element 302.

During installation, probe element 302 is inserted into the housing 306 in the direction of arrow 336. A female threaded section 338 of conical nut 318 is then threaded onto upper threaded member 332 of probe element to secure the probe element to the housing 306. The conical nut 318 includes a bottom tapered surface 340 configured to force the insulation 334 outwardly against tapered surface 342 of dielectric insert 322 to retain the probe element 302 within the housing 306 and prevent movement of the probe element 302 in the direction of arrow 344. Tapered section 328 of probe element 302 is configured to engage a tapered section 346 of dielectric insert 322 to prevent movement of the probe element 302 in the direction of arrow 336.

The embodiment of the sensor apparatus 300 provides improved control of impedance transition between the various elements of the sensor apparatus 300. Since the bulbous double tapered section of the probe elements shown in the previous embodiments is eliminated in probe element 302, the shape of probe element 302 facilitates maintaining the ratio between the outer diameter of the probe element and the diameter of the mounting elements of sensor apparatus 300. The shape of probe element 302 therefore helps to minimize impedance changes in the sensor apparatus 300.

The sensor apparatus 300 permits the overall size of the housing 306 to be reduced while maintaining the desired impedance transitions for permitting high frequency, TDR signals to be transmitted from the high frequency connector 320 to the probe element 302.

If necessary, the open area 316 may be filled with a suitable dielectric material to improve impedance transition. The angle of the taper of the dielectric insert 314, or the conical nut 318 may also be changed to control impedance changes or transitions. It is understood that the static discharge networks discussed above with reference to FIG. 3 may also be used in the sensor apparatus 300 and that other elements discussed in previous figures could be incorporated into apparatus 300 such as the spring biasing member discussed previously. A launch plate 348 is preferably coupled to a top end of gland section 308 with suitable fasteners.

Figure 14:
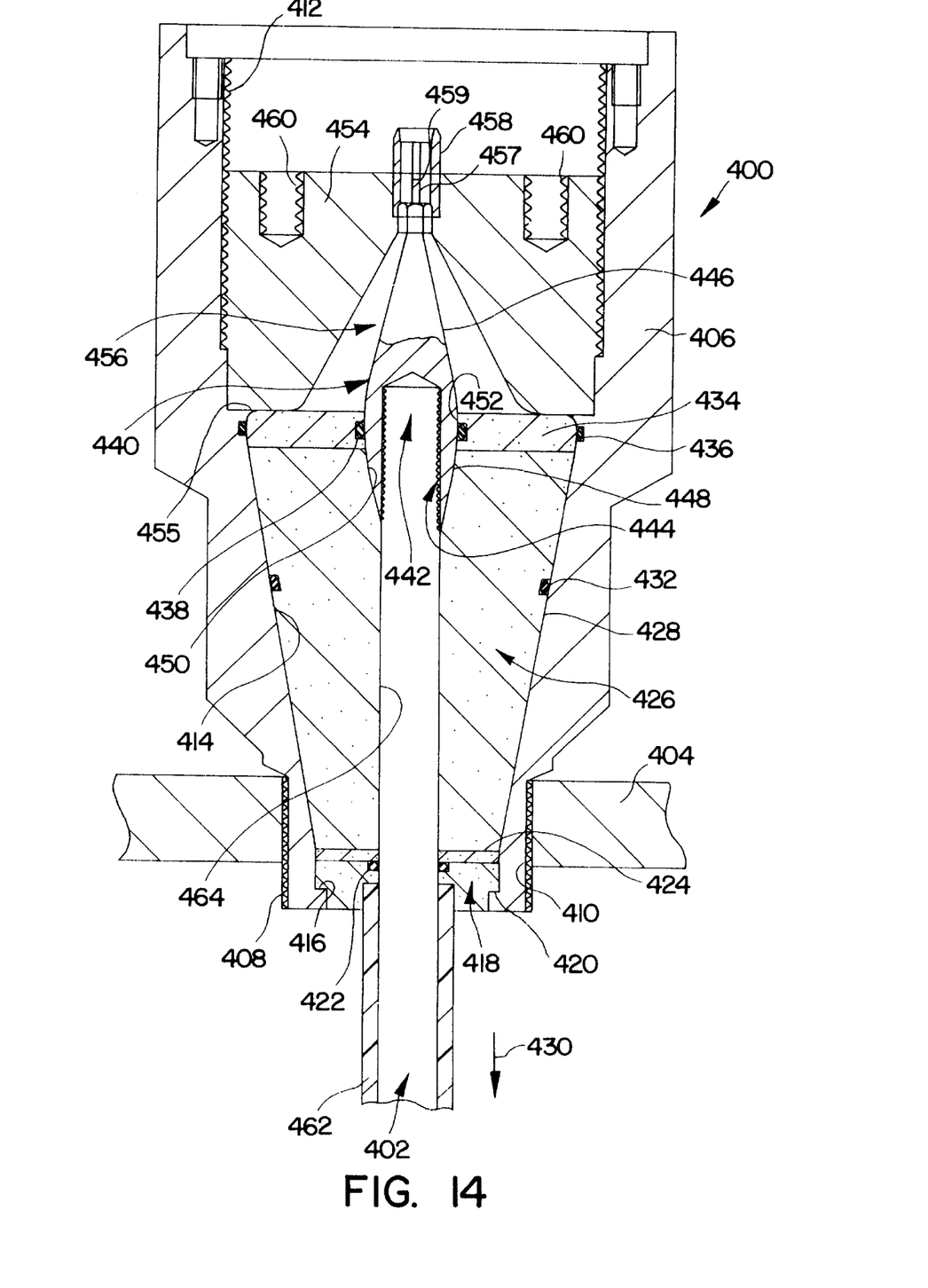
FIG. 14 is a sectional view taken through a further embodiment of the present invention for mounting a probe element, preferably a cable, rod or wire rope probe, to a vessel.

Another embodiment of the present invention is illustrated in FIG. 14. The sensor apparatus 400 is provided for coupling a probe element 402 to a vessel 404. Preferably, the probe element 402 is a flexible cable, rod, or wire rope probe element. Sensor apparatus 400 includes an upper mounting gland section 406 having a lower threaded section 408 coupled to a threaded section 410 of vessel 404. The internal surfaces and dimensions of apparatus 400 are selected to provide the desired impedances.

Upper gland section 406 consists of an upper internal threaded (or grooved) portion 412, an inwardly tapered section 414, and a bottom flange 416. A first dielectric insert 418 is located near a bottom end of mounting section 406. Dielectric insert 418 includes an outer flange 420 for engaging flange 416 of mounting section 406. An O-ring conductor seal 422 is located adjacent dielectric insert 418. A dielectric wafer 424 is located above the first dielectric insert 418, and provides one continuous seat for O-ring 422, and insert 418 provides another.

A second dielectric insert 426 is also located within an internal region of the mounting section 406. Insert 426 may be in two or more pieces or may be a single piece. In the embodiment shown in FIG. 14, insert 426 is in two pieces. The second dielectric insert 426 is formed to include a conically shaped or tapered outer sidewall 428 for engaging the tapered section 414 of mounting section 406. Further, the shape, dimension and material of mounting section 406 are selected to provide the desired impedances. Therefore, second dielectric insert 426 provides a retention force to hold the probe element 402 inside a mounting section 406. In other words, the outer tapered surface 428 of dielectric insert 426 prevents movement of the probe element in the direction of arrow 430. In the two piece embodiment of insert 426, an O-ring seal 432 is provided on insert 426 to center and hold the two pieces of the insert 426 during assembly within the tapered surface 414 of mounting section 406. In the one piece embodiment of insert 426, no O-ring 432 is used.

A second dielectric wafer 434 is located above the second insert 426. An outer O-ring 436 and an inner O-ring 438 are provided to seal the dielectric wafer 434 against passage of process materials. An electrical transitioning connector 440 is coupled to a top end 442 of probe element 402. Connector 440 is made from stainless steel. Top end 442 is illustratively coupled to connector 440 by a suitable mechanical connection such as a threaded coupling, soldering, etc. as indicated at location 444. Connector 440 includes an upper tapered or conical section 446 and a lower tapered or conical section 448. The conical section 446 is shaped to optimize the impedance relationship to the surroundings. Lower conical section 448 is configured to engage a tapered section 450 of insert 426 to prevent movement of the connector 440 in the direction of arrow 430. The lower tapered section 448 also engages a tapered section 452 formed in wafer 434, which serves to facilitate the seal of O-rings 436 and 438.

A metallic insert 454 is threaded or alternately held with a spring element and retainer (not shown) into top end of mounting section 406. Insert 454 engages flange 455 on housing 406. Preferably insert 454 is stainless steel, but could be made from other corrosive resistant materials. The insert 454 includes a conical opening 456 surrounding the connector 440. It is understood that the open-air space 456 may be filled with another dielectric material, if necessary or desired to improve electrical transmission of the high frequency, TDR electrical signals. The shape, dimension and material of the space 456 are selected to provide the desired impedances.

A high frequency electrical connector 458, preferably an SMA connector, is coupled to an upper end of connector 440 to provide an electrical connection between a high frequency cable and the probe element 402. Further, the upper end 457 of connector 440 is slidable within an aperture 459 in connector 458 to allow for some movement of probe element 402. Again an aperture could be formed in the upper end 457 of connector 440 and connector 458 could include a pin slidably engaging the aperture. Insert 454 is installed by way of a tool inserted into threaded or non-threaded openings 460. The probe element 402 is illustratively coated with an insulative material 462, such as Teflon. Probe 402 can be used without the insulative coating, if desired.

In order to facilitate on site repair, during installation of the sensor apparatus 400, the top end 442 of probe element 402 can be coupled to the conical connector 440 prior to installation into the vessel 404. After the mounting section 406 is coupled to the vessel 404, the probe element 402 can then be inserted downwardly through an aperture 464 formed in dielectric insert 426 and into the vessel 404. As discussed above, engagement of the tapered section 448 of connector 440 with the tapered surface 450 of insert 426 prevents movement of the probe element 402 in the director of arrow 430. In addition, engagement of the tapered outer surface 428 of the dielectric insert 426 with the tapered inner sidewall 414 of mounting section 404 prevents movement in the direction of arrow 430.

The dielectric constants of insert 418, wafer 424, insert 426, wafer 434, and area 456 are selected to minimize impedance transitions encountered by the electrical signal passing from the connector 458, through the connection pin 440 and into the probe element 402. The configuration of sensor apparatus 400 therefore permits high frequency, TDR signals to be transmitted down the probe element 402 for determining the contents in the vessel 404.

Although the invention has been described in detail with reference to certain preferred embodiments, variations and modifications exist within the scope and spirit of the present invention as described and defined in the following claims.

What is claimed is:

1. A sensor apparatus for transmitting electrical pulses from a signal line into and out of a vessel to measure a process variable, the sensor apparatus comprising:
    a mounting section configured to be coupled to the vessel, the mounting section being formed to include a central aperture defined by a first tapered surface;
    at least one dielectric insert having a second tapered surface configured to engage the first tapered surface of the mounting section to prevent movement of the at least one dielectric insert in a direction away from the mounting section and a third tapered surface;
    a conductive transitioning pin having a fourth tapered surface configured to engage the third tapered surface of the at least one dielectric insert;
    a metallic insert located above the transitioning pin and the at least one dielectric insert, the metallic insert being coupled to the mounting section to secure the at least one dielectric insert within the mounting section;
    a conductive probe element coupled to the transitioning pin and extending downwardly through the at least one dielectric insert and into the vessel; and
    an electrical connector coupled to the transitioning pin, the electrical connector being configured to couple the signal line to the probe element through the transitioning pin.

2. The apparatus of claim 1 wherein at least one of the electrical connector and the conductive pin includes an aperture and the other of the electrical connector and the conductive pin slidably engages the aperture to permit movement of the probe element relative to the mounting section.

3. The apparatus of claim 1 further comprising another dielectric insert located adjacent a bottom end of the mounting section below the at least one dielectric insert.

4. The apparatus of claim 3 further comprising an O-ring seal located between the said another dielectric insert and the probe element.

5. The apparatus of claim 3, further comprising a dielectric wafer surrounding the probe element between the at least one dielectric insert and the said another dielectric insert.

6. The apparatus of claim 1 further comprising a dielectric wafer located between the at least one dielectric insert and the metallic insert.

7. The apparatus of claim 6 further comprising a first O-ring seal located between the wafer and the transitioning pin, and a second O-ring seal located between the mounting section and an outer circumference of the wafer.

8. The apparatus of claim 1 wherein the conductive probe element includes a section having a reduced diameter adjacent a top end of the probe element and a fifth tapered surface providing a transition to the reduced diameter section and the at least one dielectric insert includes a sixth tapered section for engaging the fifth tapered section to prevent movement of the probe element in a direction toward the mounting section.

9. The apparatus of claim 8 wherein at least one of the electrical connector and the connector pin includes an aperture and the other of the electrical connector and the conductive pin slidably engages the aperture to permit movement of the probe element relative to the mounting section.

10. The apparatus of claim 8, wherein the conductive pin includes a conically shaped transition section.

11. The apparatus of claim 10, wherein the conical shaped section has a first diameter adjacent the electrical connector and a second diameter adjacent the probe element, the second diameter being larger than the first diameter.

* * * * *